L. E. PORTER.
FRUIT PICKER.
APPLICATION FILED JUNE 25, 1914.
1,132,794.
Patented Mar. 23, 1915.
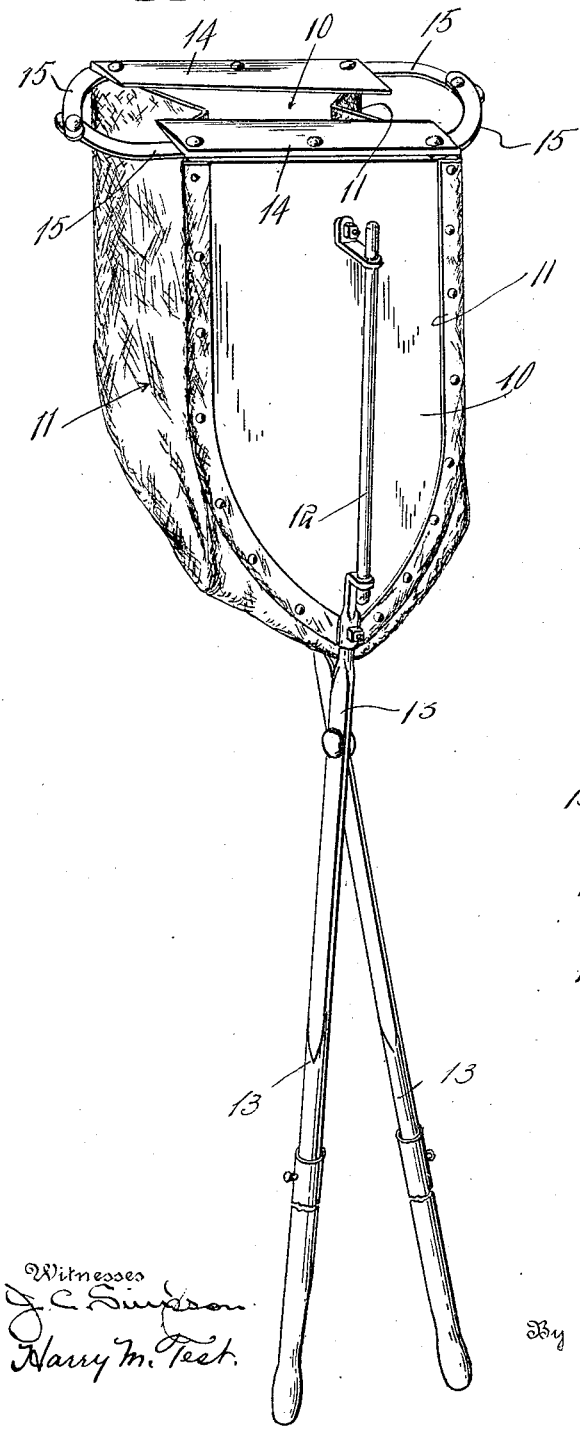
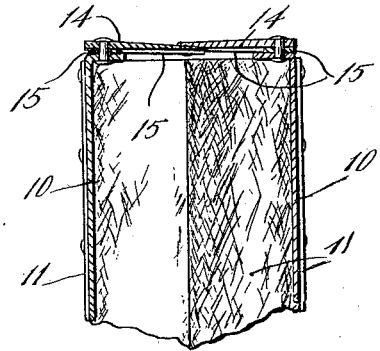
Inventor
L. E. Porter
Witnesses

UNITED STATES PATENT OFFICE.

LULA E. PORTER, OF PAWHUSKA, OKLAHOMA.

FRUIT-PICKER.

1,132,794. Specification of Letters Patent. Patented Mar. 23, 1915.

Application filed June 25, 1914. Serial No. 847,254.

*To all whom it may concern:*

Be it known that I, LULA E. PORTER, a citizen of the United States, residing at Pawhuska, in the county of Osage, State of Oklahoma, have invented certain new and useful Improvements in Fruit-Pickers; and I do hereby declare the following to be a full, clear, and exact description of the invention, such as will enable others skilled in the art to which it appertains to make and use the same.

This invention relates to improvements in fruit gathering devices.

The principal object of the invention is to provide a simple and novel device by means of which fruit can be quickly and easily severed from the branches of the tree and lowered to a suitable receptacle without bruising the fruit.

Other objects and advantages will be apparent from the following description, when taken in connection with the accompanying drawings.

In the drawings: Figure 1 is a perspective view of my improved fruit picking device. Fig. 2 is an enlarged vertical sectional view through the upper portion of the device showing the construction and arrangement of the clipping knives.

Referring particularly to the accompanying drawing, 10—10 represent the sides of the gathering device which are formed preferably of sheets of metal such as tin, the marginal edges of which are connected by the canvas or other fabric strips 11. Extending longitudinally on the side members 10 are rods 12 the lower ends of which are connected with the upper ends of the cross pivoted handles 13 disposed below the bottom of the gathering device. These handles are extensible, as shown, so that they can be lengthened or shortened according to the height it is desired to reach into the tree.

Mounted on the upper edge of each of the side members 10 is a knife blade 14, each of the blades extending approximately the entire length of the upper edge of the side and extending inwardly toward each other, but in different horizontal planes so that they will pass each other and produce a shearing action to sever a fruit stem therebetween. Pivotally connected to each end of each of the blades is a link 15, and the links of the corresponding ends of the blades are pivotally connected together.

In the operation of the device, the handles 13 are grasped and the receptacle stretched open and pushed up into the tree so that the piece of fruit enters the mouth of the receptacle. Upon drawing the handles together the upper end of the receptacle will be forced together and cause the knives to sever the stem.

It will be noticed upon reference to Fig. 1 that the fabric strips 11 are so shaped that the fruit receiver is tapered in the plane of movement of the handle 13 so that when the cutting blades 14 are brought together, the fruit is not crushed.

What is claimed is:

A fruit picking device comprising a receptacle including rigid side members and flexible end connecting members, a pair of coöperating horizontal knives mounted on the upper ends of the side members, pivotally connected links pivotally connected to the ends of the knives, and crossed and pivoted operating handles secured to the side members.

In testimony whereof, I affix my signature, in the presence of two witnesses.

LULA E. PORTER.

Witnesses:
 CHAS. R. GRAY,
 O. H. EDEN.

Copies of this patent may be obtained for five cents each, by addressing the "Commissioner of Patents, Washington, D. C."